(12) United States Patent
Choi et al.

(10) Patent No.: US 10,502,267 B2
(45) Date of Patent: Dec. 10, 2019

(54) DECOUPLER AS ONE-WAY CLUTCH

(71) Applicants: Hyundai Motor Company, Seoul (KR); Kia Motors Corporation, Seoul (KR)

(72) Inventors: Kum Lim Choi, Seoul (KR); Chiwon Shon, Gyeonggi-do (KR); Keunseok Lee, Gyeonggi-do (KR); Uk Han Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 129 days.

(21) Appl. No.: 15/829,886

(22) Filed: Dec. 2, 2017

(65) Prior Publication Data
US 2019/0010995 A1    Jan. 10, 2019

(30) Foreign Application Priority Data

Jul. 10, 2017  (KR) ......................... 10-2017-0086931

(51) Int. Cl.
| | |
|---|---|
| *F16H 55/36* | (2006.01) |
| *F16D 41/069* | (2006.01) |
| *F16D 41/06* | (2006.01) |
| *F16D 7/02* | (2006.01) |

(52) U.S. Cl.
CPC .............. *F16D 7/02* (2013.01); *F16D 41/069* (2013.01); *F16H 55/36* (2013.01); *F16D 2041/0603* (2013.01); *F16H 2055/366* (2013.01)

(58) Field of Classification Search
CPC .......... F16D 41/07; F16D 7/02; F16D 41/061; F16D 41/069; F16D 2041/0603; F16D 2041/0646; F16D 41/08; F16D 41/084; F16H 55/36; F16H 2055/366
See application file for complete search history.

(56) References Cited

U.S. PATENT DOCUMENTS

| 5,664,653 A | * | 9/1997 | Kurita ..................... F16D 41/07 |
| | | | 188/82.1 |
| 7,712,592 B2 | | 5/2010 | Jansen et al. |
| 2006/0060442 A1 | * | 3/2006 | Muramatsu ............. F16D 41/07 |
| | | | 192/45.1 |

FOREIGN PATENT DOCUMENTS

FR        2858031 A1 *  1/2005  ........... F16D 41/069

* cited by examiner

*Primary Examiner* — David R Morris
*Assistant Examiner* — James J Taylor, II
(74) *Attorney, Agent, or Firm* — Mintz Levin Cohn Ferris Glovsky and Popeo, P.C.; Peter F. Corless

(57) ABSTRACT

A decoupler is provided that includes a pulley around which a belt is wound. A sprag limiter is fixed to an interior circumference of the pulley and has protrusions formed at predetermined intervals in a circumferential direction on an interior circumference thereof. A sprag hub is disposed in the sprag limiter and has first apertures formed at predetermined intervals from an interior circumference to an exterior circumference thereof. A shaft hub is disposed in the sprag hub and has second apertures that are formed to correspond to the first apertures from an interior circumference to an exterior circumference thereof. Sprags having lower end portions are each inserted into the second apertures, central portions are each inserted into the first apertures, and upper end portions are in contact with the interior circumference of the sprag limiter, and allow the shaft hub to rotate in one direction based on the pulley movement.

10 Claims, 8 Drawing Sheets

DECOUPLER AS ONE-WAY CLUTCH

CROSS-REFERENCE TO RELATED APPLICATION

This application claims priority to and the benefit of Korean Patent Application No. 2017-0086931 filed on Jul. 10, 2017, the entire contents of which are incorporated herein by reference.

BACKGROUND

(a) Field of the Invention

The present invention relates to a decoupler, and more particularly, to a decoupler capable of decreasing a rotation vibration and noise, improving durability of a belt, and decreasing slip and noise generated by a pulley and the belt by generating a speed difference between the pulley and a hub.

(b) Description of the Related Art

It has been well-known to transfer a portion of an output shaft of an engine of a vehicle to belt driving accessory components using a serpentine belt in the engine. Generally, the respective components include pulleys fastened to the belt to thus be driven, and the belt is driven by an output pulley directly connected to a crankshaft of the engine. The pulley of the belt driving accessory component is rotatably mounted on the drive shaft, and an example of the belt driving accessory component as described above includes an alternator.

An internal combustion engine is operated by pulse type driving force, repeats acceleration and deceleration, and generates a vibration and noise. As a result of such a changing speed, the belt driving accessory components operated by the crankshaft repeat acceleration and deceleration. Accordingly, due to a rapid variation of a speed and a vibration, durability of the belt driving accessory components may be deteriorated, and a high level of noise and vibration may be generated. Additionally, rapid acceleration and deceleration of the engine, such as shifting, engine starting, and starting-off may cause slip between the belt and the pulley, as well as a high load on the belt. For a drive shaft of the alternator to overrun or rotate at a speed greater than that of the pulley or for a rotation speed of the pulley to be varied with respect to the alternator, a decoupler operably fastened between the belt driving accessory component such as the alternator and the pulley has been introduced.

Meanwhile, to increase a lifespan of the belt connecting the alternator and the engine to each other and decrease tension of the belt to increase fuel consumption, an overrunning alternator pulley (OAP) and an overrunning alternator decoupler (OAD) have been conventionally used. The OAP includes a one-way clutch in the pulley, and the OAD includes a one-way clutch and a spring in the pulley. In addition, the OAD includes the spring to have vibration absorbing performance more improved than that of the OAP, but a load is transferred through one spring, and a torsion vibration may be continuously applied to the spring to damage the spring and a spring hub. Therefore, research regarding a decoupler capable of improving the durability and decreasing the vibration and the noise generated between the engine and the alternator, or the like, by improving structures of the spring and the one-way clutch has been conducted.

The above information disclosed in this section is merely for enhancement of understanding of the background of the invention and therefore it may contain information that does not form the prior art that is already known in this country to a person of ordinary skill in the art.

SUMMARY

The present provides a decoupler having advantages of operating as a one-way clutch between a pulley and a hub, decreasing noise and a vibration generated in a belt internal combustion engine, improving durability of a belt wound around the pulley, and decreasing noise generated due to slip between the belt and the pulley.

An exemplary embodiment of the present invention provides a decoupler that may include: a pulley around which a belt may be wound; a sprag limiter fixed to an interior circumference of the pulley and having protrusions formed at predetermined intervals in a circumferential direction on an interior circumference thereof; a sprag hub disposed in the sprag limiter and having first apertures formed at predetermined intervals in the circumferential direction from an interior circumference thereof to an exterior circumference thereof; a shaft hub disposed in the sprag hub and having second apertures formed at positions each corresponding to the first apertures from an interior circumference thereof to an exterior circumference thereof; and sprags having lower end portions each inserted into the second apertures, central portions each inserted into the first apertures, and upper end portions formed to be in contact with the interior circumference of the sprag limiter, and allowing the shaft hub to rotate in one direction based on the pulley movement.

The decoupler may further include fins that fix each of the sprags to the sprag hub by penetrating between the interior circumference and the exterior circumference of the sprag hub in an axial direction to correspond to positions of the first apertures. The interior circumference of the shaft hub may be fixed to an exterior circumference of a rotation shaft of an alternator. The upper end portions of the sprags may be biased toward one side in a rotating direction of the pulley. The pulley and the sprag limiter may be formed integrally with each other. The protrusion and the pulley may be formed integrally with each other. Additionally, the decoupler may further include: a first bearing interposed between the interior circumference of the pulley and the exterior circumference of the sprag hub; and a second bearing interposed between the interior circumference of the sprag hub and the exterior circumference of the shaft hub. The first bearing may be a journal bearing, and the second baring may be a ball bearing.

Another exemplary embodiment of the present invention provides a belt driving system that may include: a decoupler; and a belt wound around a pulley of the decoupler. Yet another exemplary embodiment of the present invention provides an engine driving system that may include: a decoupler; an engine pulley disposed at an output shaft of an engine; and a belt wound around a pulley of the decoupler and the engine pulley.

Yet still another exemplary embodiment of the present invention provides a decoupler that may include: a sprag limiter having protrusions formed at predetermined intervals in a circumferential direction on an interior circumference thereof; a sprag hub disposed in the sprag limiter and having first apertures formed at predetermined intervals in the circumferential direction from an interior circumference thereof to an exterior circumference thereof; a shaft hub disposed in the sprag hub and having second apertures formed at positions each corresponding to the first apertures from an interior circumference thereof to an exterior circumference thereof; and sprags having lower end portions each inserted into the second apertures, central portions each inserted into the first apertures, and upper end portions formed to be in contact with the interior circumference of the sprag limiter, and allowing the shaft hub to rotate in one direction based on a pulley movement. The decoupler may further include fins that fix each of the sprags to the sprag hub. The upper end portions of the sprags may be biased toward one side in a rotating direction of the sprag limiter.

According to the present invention for accomplishing these objects, the sprags may operate as a one-way clutch based on the sprag hub, and the lower end portions of the sprags may operate as a spring that absorbs a speed difference in a rotating direction between the sprag hub and the alternator hub. In addition, a vibration and noise generated between the pulley and the alternator may be decreased, and impact transferred from the pulley to the belt may be decreased to improve durability of the belt, and slip noise generated in the belt may be removed. Further, an overrunning state and a synchronous rotation state may be implemented, and a state in which rotation impact between the pulley and the alternator hub is absorbed may be implemented more easily.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

DESCRIPTION OF SYMBOLS

Figure 1:
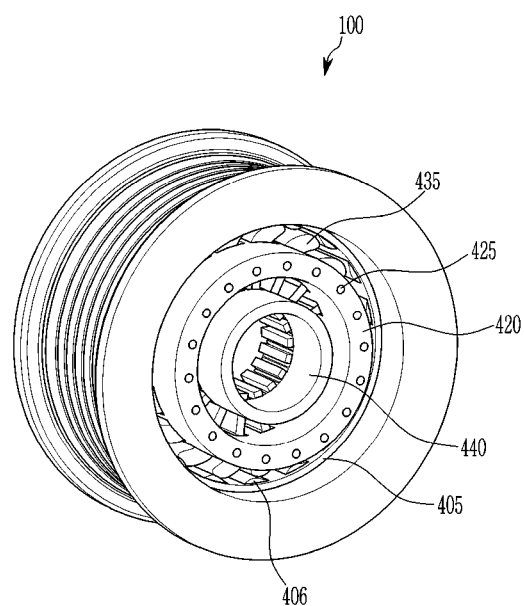
FIG. 1 is a perspective view showing a decoupler according to an exemplary embodiment of the present invention from which bearings are excluded.

100: decoupler
400: pulley
405: sprag limiter
406: protrusion
410: ball bearing
415: journal bearing
420: sprag hub
425: fin
430: first aperture
435: sprag
440: alternator hub
445: second aperture

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an exemplary embodiment of the present invention will be described in detail with reference to the accompanying drawings. However, since sizes and thicknesses of the respective components were arbitrarily shown in the accompanying drawings for convenience of explanation, the present invention is not limited to contents shown in the accompanying drawings. In addition, thicknesses were exaggerated in order to obviously represent several portions and regions.

However, contents that are not associated with a description will be omitted in order to clearly describe an exemplary embodiment of the present invention, and components that are the same as or are similar to each other will be denoted by the same reference numerals throughout the present specification. In the following description, terms 'first', 'second', and the like, will be used to distinguish components having the same names from each other, and will not be necessarily limited to a sequence thereof.

Figure 2:
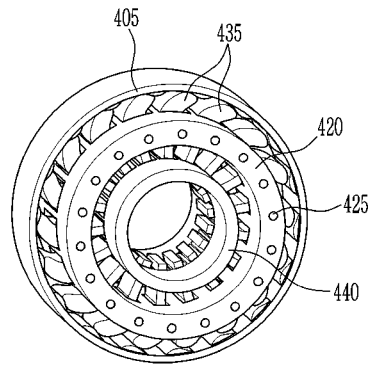
FIG. 2 is a perspective view showing a decoupler according to an exemplary embodiment of the present invention from which a pulley and the bearings are excluded.
Figure 3:
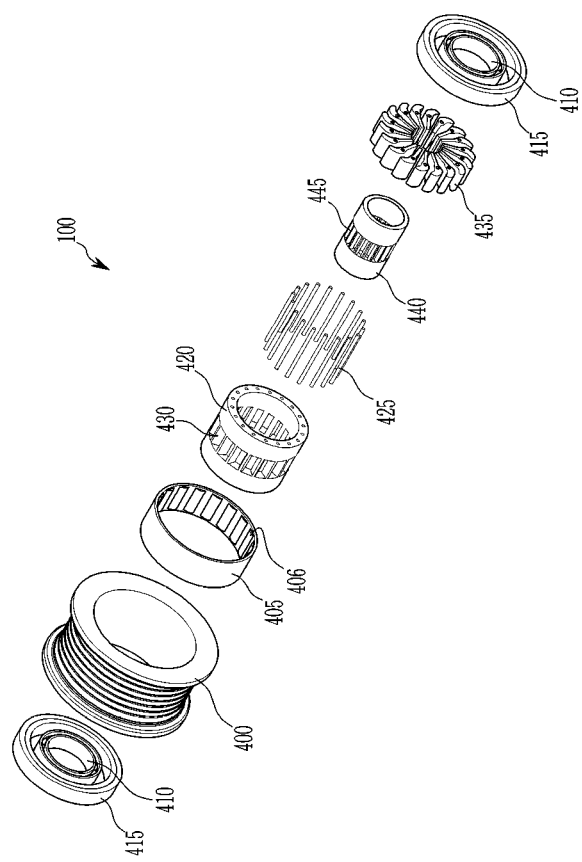
FIG. 3 is a detailed view showing the decoupler according to an exemplary embodiment of the present invention.

FIG. 1 is a perspective view showing a decoupler according to an exemplary embodiment of the present invention from which bearings are excluded, FIG. 2 is a perspective view showing a decoupler according to an exemplary embodiment of the present invention from which a pulley and the bearings are excluded, and FIG. 3 is an exploded perspective view showing the decoupler according to an exemplary embodiment of the present invention. Referring to FIGS. 1 to 3, the decoupler 100 includes a pulley 400, a sprag limiter 405, protrusions 406, ball bearings 410, journal bearings 415, a sprag hub 420, first apertures 430, fins 425, sprags 435, an alternator hub 440 and second apertures 445 as main components.

The alternator hub 440, which has a pipe structure, may include an alternator shaft (not illustrated) inserted and fixed thereinto, and the alternator shaft and the alternator hub 440 may be configured to rotate together with each other. The pulley 400 may be disposed to be coaxial with the alternator hub 440, a belt groove around which a belt (not shown) is wound may be formed in an exterior circumference of the pulley 400, and the belt may be wound around a main shaft rotating by an engine and the pulley. In particular, the belt may be configured to transfer a torque of the engine to the pulley 400, and transfer a torque of the pulley 400 to the engine.

The sprag limiter 405, the sprag hub 420, and the sprags 435 may be disposed at a central portion between an interior circumference of the pulley 400 and the alternator hub 440. In particular, an exterior circumference of the sprag limiter 405 may be fixed to the interior circumference of the pulley 400, and the protrusions 406 may be formed at predetermined intervals on an interior circumference of the sprag limiter 405. The sprag limiter 405 may have a relatively short pipe shape, and the sprag limiter 405 and the protrusions 406 may be formed integrally with each other on the interior circumference of the pulley 400.

Additionally, the sprag hub 420 may have a relatively short pipe shape in which a length thereof is the same as or similar to a length of the alternator hub 440, and when the sprag hub 420 has a structure in which the alternator hub 440 is inserted into a central portion of the sprag hub 420, a predetermined gap may be formed between an interior circumference of the sprag hub 420 and an exterior circumference of the alternator hub 440. The first apertures 430 penetrating from the interior circumference of the sprag hub 420 to an exterior circumference of the sprag hub 420 may be formed in the sprag hub 420. The first apertures 430 may be arranged at predetermined intervals along the exterior circumferences of the sprag hub 420.

Further, the second apertures 445 penetrating from an interior circumference of the alternator hub 440 to the exterior circumference of the alternator hub 440 may be formed in the alternator hub 440. The second apertures 445 may be arranged at predetermined intervals along the exterior circumferences of the alternator hub 440. Lower end portions of the sprags 435 may be inserted into the second apertures 445, and upper end portions of the sprag 435 may be inserted into the first apertures 430. The sprags 435 may be arranged at predetermined intervals in a rotating direction around a shaft to correspond to the first apertures 430 and the second apertures 445.

The fins 425 may be inserted in an axial direction between the interior circumference and the exterior circumference of the sprag hub 420 to penetrate central portions of the sprags 435 penetrating the first apertures 430, and fix the sprags 435 to the sprag hub 420. The sprags 435 may be disposed to be rotatable in the sprag hub 420 around the fins 425, and the upper end portions of the sprags 435 may be in contact with the interior circumference of the sprag limiter 405 or the protrusions. The journal bearings 415 may be interposed between the interior circumference of the pulley 400 and the exterior circumference of the sprag hub 420, and the ball bearings 410 may be interposed between the interior circumference of the sprag hub 420 and the exterior circumference of the alternator hub 440.

Figure 7:
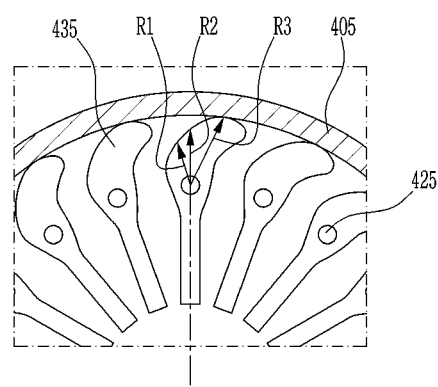
FIG. 7 is a partially detailed front view showing a form of the sprags in the decoupler according to an exemplary embodiment of the present invention.

FIG. 7 is a partially detailed front view showing a form of the sprags in the decoupler according to an exemplary embodiment of the present invention. Referring to FIG. 7, the fin 425 may have a structure in which it penetrates the central portion of the sprag 435 in a shaft direction, and the upper end portion of the sprag 435 may have a structure in which it is biased toward one side and the lower end portion of the sprag 435 may extend toward the shaft.

In particular, a first side of the upper end portion of the sprag 435 may have a first distance R1 based on the fin 425, a second side of the upper end portion of the sprag 435 may have a third distance R3 based on the fin 425, and a central portion of the upper end portion of the sprag 435 corresponding to a radius of the sprag limiter 405 may have a second distance R2 based on the fin 425. A form of a sprag included in the known one-way clutch is referred to with respect to a form of the upper end portion of the sprag 435, and the related art is referred to with respect to a structure and a function of the sprag.

Figure 4:
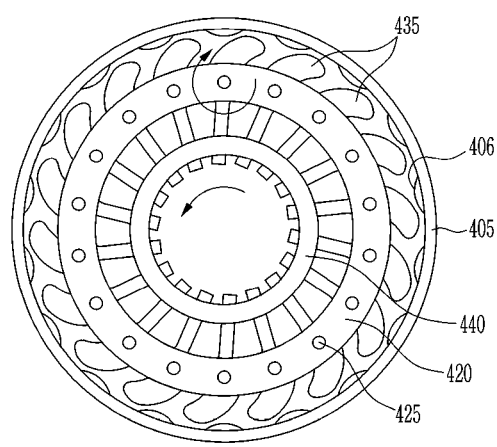
FIG. 4 is a front view showing an overrunning state of the decoupler according to an exemplary embodiment of the present invention.

FIG. 4 is a front view showing an overrunning state of the decoupler according to an exemplary embodiment of the present invention. Referring to FIG. 4, when the alternator hub 440 rotates in a counterclockwise direction, the sprags 435 may be configured to rotate by a predetermined angle in a clockwise direction around the fins 425, and frictional force may be removed between the sprags 435 and the sprag limit 405. Therefore, the overrunning state in which the alternator hub 440 rotates in the counterclockwise direction based on the sprag limit 405 is implemented. Particularly, the alternator hub 440, the sprag hub 420, and the sprags 435 may be configured to rotate in the clockwise direction based on the sprag limiter 405. Alternatively, the sprag limiter 405 may be configured to rotate in the clockwise direction based on the alternator hub 440.

Figure 5:
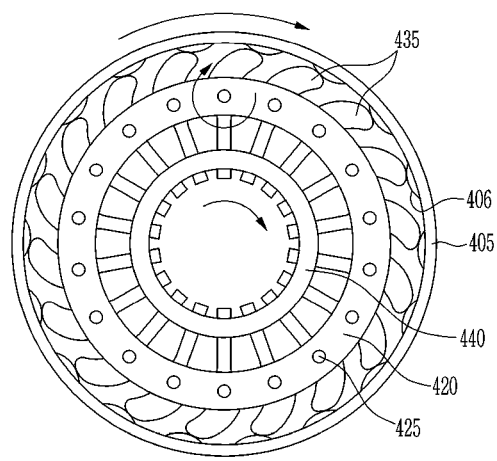
FIG. 5 is a front view showing a synchronous rotation state of the decoupler according to an exemplary embodiment of the present invention.

FIG. 5 is a front view showing a synchronous rotation state of the decoupler according to an exemplary embodiment of the present invention. Referring to FIG. 5, when the alternator hub 440 rotates in the clockwise direction, the sprags 435 may be configured to rotate by a predetermined angle in the counterclockwise direction around the fins 425, and upper end surfaces of the sprags 435 are closely adhered to the interior circumference of the sprag limit 405 (e.g., the upper end surfaces of the sprag 435 may abut the interior circumference of the sprag limit 405). Therefore, the synchronous rotation state in which the alternator hub 440 and the sprag limiter 405 may be configured to rotate together in the clockwise direction is implemented.

Figure 6:
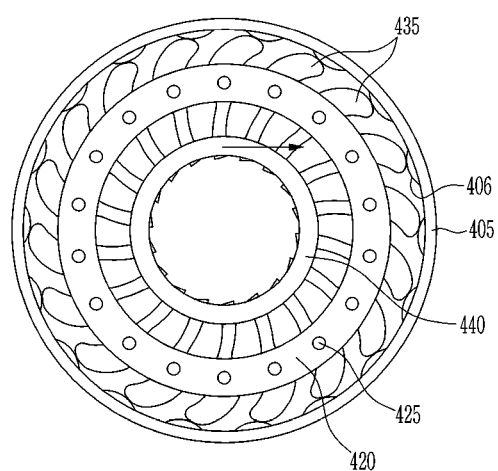
FIG. 6 is a front view showing a state in which sprags operate as a spring in the decoupler according to an exemplary embodiment of the present invention.

FIG. 6 is a front view showing a state in which sprags operate as a spring in the decoupler according to an exemplary embodiment of the present invention. Referring to FIG. 6, when the alternator hub 440 rotates in the clockwise direction, the sprags 435 may be configured to rotate by a predetermined angle in the counterclockwise direction around the fins 425, and upper end surfaces of the sprags 435 may closely adhere to (e.g., abut) the interior circumference of the sprag limit 405.

In particular, when a torque of the alternator hub 440 rotating in the clockwise direction is rapidly increased and the sprag limiter 405 is prevented from rotating, the lower end portions of the sprags 435 inserted into the second apertures 445 of the alternator hub 440 may operate as the spring while being bent in the clockwise direction. Therefore, a state in which the sprags 435 operate as the spring between the sprag limiter 405 and the alternator hub 440 may be implemented.

In an exemplary embodiment of the present invention, the sprags 435 may operate as the one-way clutch based on the sprag hub 420, and the lower end portions of the sprags 435 may operate as the spring configured to absorb a speed difference in a rotating direction between the sprag hub 420 and the alternator hub 440. In addition, a vibration and noise generated between the pulley 400 and the alternator 440 may be decreased, and impact transferred from the pulley 400 to the belt may be decreased to improve durability of the belt, and slip noise generated in the belt may be removed. Further, the overrunning state and the synchronous rotation state may be implemented, and a state in which rotation impact between the pulley 400 and the alternator hub 440 is absorbed may be implemented more easily.

Figure 8:
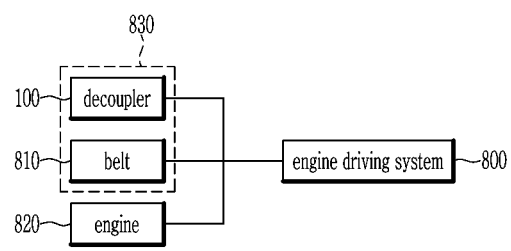
FIG. 8 is a block diagram showing an engine driving system including the decoupler according to an exemplary embodiment of the present invention.

FIG. 8 is a block diagram showing an engine driving system including the decoupler according to an exemplary embodiment of the present invention. Referring to FIG. 8, the engine driving system may include the decoupler 100, a belt 810, and an engine 820, and the engine 820 may be an internal combustion engine, a hybrid engine including an internal combustion engine and a motor, or an electric motor engine. In addition, a belt driving system 830 may include the belt 810 and the decoupler 100.

The decoupler 100 has been described above with reference to FIGS. 1 to 7, and the belt 810 may connect an output shaft of the engine and the pulley 400 of the decoupler 100 to each other to transfer a torque of the output shaft to the decoupler 100 or transfer a torque of the decoupler 100 to the output shaft. In an exemplary embodiment of the present invention, the alternator hub 440 may be referred to as a shaft hub, and the ball bearing and the journal bearing may be referred to as first and second bearings, respectively.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A decoupler, comprising:
   a pulley around which a belt is wound;
   a sprag limiter fixed to an interior circumference of the pulley and having protrusions formed at predetermined intervals in a circumferential direction on an interior circumference thereof;
   a sprag hub disposed in the sprag limiter and having first apertures formed at predetermined intervals in the circumferential direction from an interior circumference thereof to an exterior circumference thereof;
   a shaft hub disposed in the sprag hub and having second apertures formed at positions each corresponding to the first apertures from an interior circumference thereof to an exterior circumference thereof;
   a plurality of sprags having lower end portions each inserted into the second apertures, central portions each inserted into the first apertures, and upper end portions formed to be in contact with the interior circumference of the sprag limiter, and allowing the shaft hub to rotate in one direction based on movement of the pulley; and
   a plurality of fins that fix each of the sprags to the sprag hub by penetrating between the interior circumference and the exterior circumference of the sprag hub in an axial direction to correspond to positions of the first apertures.

2. The decoupler of claim 1, wherein the interior circumference of the shaft hub is fixed to an exterior circumference of a rotation shaft of an alternator.

3. The decoupler of claim 1, wherein the upper end portions of the sprags are biased toward one side in a rotating direction of the pulley.

4. The decoupler of claim 1, wherein the pulley and the sprag limiter are formed integrally with each other.

5. The decoupler of claim 4, wherein the protrusions and the pulley are formed integrally with each other.

6. The decoupler of claim 1, further comprising:
   a first bearing interposed between the interior circumference of the pulley and the exterior circumference of the sprag hub; and
   a second bearing interposed between the interior circumference of the sprag hub and the exterior circumference of the shaft hub.

7. The decoupler of claim 6, wherein the first bearing is a journal bearing and the second bearing is a ball bearing.

8. A decoupler, comprising:
   a sprag limiter having protrusions formed at predetermined intervals in a circumferential direction on an interior circumference thereof;
   a sprag hub disposed in the sprag limiter and having first apertures formed at predetermined intervals in the circumferential direction from an interior circumference thereof to an exterior circumference thereof;
   a shaft hub disposed in the sprag hub and having second apertures formed at positions each corresponding to the first apertures from an interior circumference thereof to an exterior circumference thereof;
   sprags having lower end portions each inserted into the second apertures, central portions each inserted into the first apertures, and upper end portions formed to be in contact with the interior circumference of the sprag limiter, and allowing the shaft hub to rotate in one direction based on movement of a pulley; and
   a plurality of fins that fix each of the sprags to the sprag hub by penetrating between the interior circumference and the exterior circumference of the sprag hub in an axial direction to correspond to positions of the first aperture.

9. The decoupler of claim 8, wherein the upper end portions of the sprags are biased toward one side in a rotating direction of the sprag limiter.

10. The decoupler of claim 8, wherein the sprag limiter and the protrusions are formed integral on the pulley.

* * * * *